US012712364B1

(12) United States Patent
O'Neal et al.

(10) Patent No.: US 12,712,364 B1
(45) Date of Patent: Aug. 18, 2026

(54) AI-ASSISTED LOAD REDUCTION POWER MANAGEMENT SYSTEM

(71) Applicant: United Services Automobile Association (USSA), San Antonio, TX (US)

(72) Inventors: Nickolaus Wayne O'Neal, Adkins, TX (US); Brian Tougas, Spring Branch, TX (US); Gideon Bowie Luck, Plano, TX (US); Nathan Lee Post, Rockport, TX (US); Daniel Scott Veibell, Plano, TX (US); Edward Manuel Alonzo, III, San Antonio, TX (US); Sean Carl Mitchem, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 409 days.

(21) Appl. No.: 18/456,864

(22) Filed: Aug. 28, 2023

(51) Int. Cl.

| | |
|---|---|
| ***H02J 3/12*** | (2026.01) |
| ***H02J 3/001*** | (2026.01) |
| ***H02J 3/0012*** | (2026.01) |
| *H02J 103/30* | (2026.01) |
| *H02J 103/35* | (2026.01) |
| *H02J 105/52* | (2026.01) |
| *H02J 105/53* | (2026.01) |

(52) U.S. Cl.
CPC .............. *H02J 3/12* (2013.01); *H02J 3/0012* (2020.01); *H02J 3/00125* (2020.01); *H02J 2103/30* (2026.01); *H02J 2103/35* (2026.01); *H02J 2105/52* (2026.01); *H02J 2105/53* (2026.01)

(58) Field of Classification Search
None
See application file for complete search history.

(56) References Cited

U.S. PATENT DOCUMENTS

| | | | | |
|---|---|---|---|---|
| 6,519,509 | B1 * | 2/2003 | Nierlich | H02J 3/008 700/286 |
| 10,840,735 | B1 * | 11/2020 | Cooper | H02J 3/32 |
| 10,971,949 | B2 * | 4/2021 | Carr | G01R 11/56 |
| 2022/0294222 | A1 * | 9/2022 | Winter | H02J 3/144 |

* cited by examiner

*Primary Examiner* — Mohammad Ali
*Assistant Examiner* — Peter Xu
(74) *Attorney, Agent, or Firm* — Fletcher Yoder, P.C.

(57) ABSTRACT

A power management system may include processing circuitry and storage media storing instructions that, when executed by the processing circuitry cause the processing circuitry to perform operations. The operations may include receiving an overload indicator indicative of an overload condition of a power grid that supplies electrical power to multiple consumers and implementing a load reduction plan for a consumer in response to the overload indicator. The load reduction plan may indicate one or more electrical components of the consumer for which to reduce respective power draws. The operations may also include sending one or more control signals to the electrical components in accordance with the load reduction plan to change respective operating states of the electrical components such that the respective power draws of the electrical components are reduced.

18 Claims, 6 Drawing Sheets

AI-ASSISTED LOAD REDUCTION POWER MANAGEMENT SYSTEM

FIELD OF THE TECHNOLOGY

The present disclosure is related to providing grid tied power management solutions. More specifically, a power management system may provide power management solutions for strategically reducing loads at different consumer locations of a power grid.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In general, power is provided to consumers via a power grid fed by one or more power stations. For example, larger regional power stations and/or smaller distributed power stations, such as more localized power stations, may provide electricity to homes and businesses via a network of power lines. Furthermore, power generation may be regulated based on current and/or expected usage to provide electricity to the consumers. However, power interruptions such as blackouts or brownouts may occur when the available power is less than the combined loads of the consumers. For example, load increases may be associated with weather or the time of day while supply decreases may occur due to partial or total power generation failures and/or power line failures, to name a few. Moreover, overall power consumption may generally increase over time in some areas, such as growing metropolitans, suburbs, etc., putting additional strain on the power grid.

Such power interruptions and/or overall load increases oftentimes result in unexpected issues and/or poor end user experiences. Indeed, it may be desired to reduce or eliminate overdraw of electricity from the power grid. As such, strategically reducing loads in response to a power availability reduction and/or the overall power consumption reaching a threshold limit may reduce or eliminate such power interruptions.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a power management system may include processing circuitry and storage media storing instructions that, when executed by the processing circuitry cause the processing circuitry to perform operations. The operations may include receiving an overload indicator indicative of an overload condition of a power grid that supplies electrical power to multiple consumers and implementing a load reduction plan for a consumer in response to the overload indicator. The load reduction plan may indicate one or more electrical components of the consumer for which to reduce respective power draws. The operations may also include sending one or more control signals to the electrical components in accordance with the load reduction plan to change respective operating states of the electrical components such that the respective power draws of the electrical components are reduced.

In one embodiment, a method may include receiving, via a power management system, feedback signals indicative of respective power draws of electrical loads of a consumer of an electrical grid. The electrical grid supplying electrical power to the consumer. The method may also include generating, via an assessment module of the power management system, a user profile having associations with types of electrical devices associated with the electrical loads and usages of the electrical devices based on the feedback signals. Additionally, the method may include providing, via a graphical user interface, a product offering, a service offering, or both to a user associated with the user profile based on the user profile.

In one embodiment, a system may include a power grid that provides electrical power to multiple consumers and a power management system of a utility operator. The power management system may monitor conditions of the power grid and generate an overload indicator indicative of an overload condition of the power grid. The power management system may also implement a load reduction plan for a consumer in response to the overload indicator, wherein the load reduction plan indicates one or more electrical components of the consumer for which to reduce respective power draws. Additionally, the power management system may send one or more control signals to the electrical components in accordance with the load reduction plan to change respective operating states of the electrical components such that the respective power draws of the electrical components are reduced.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
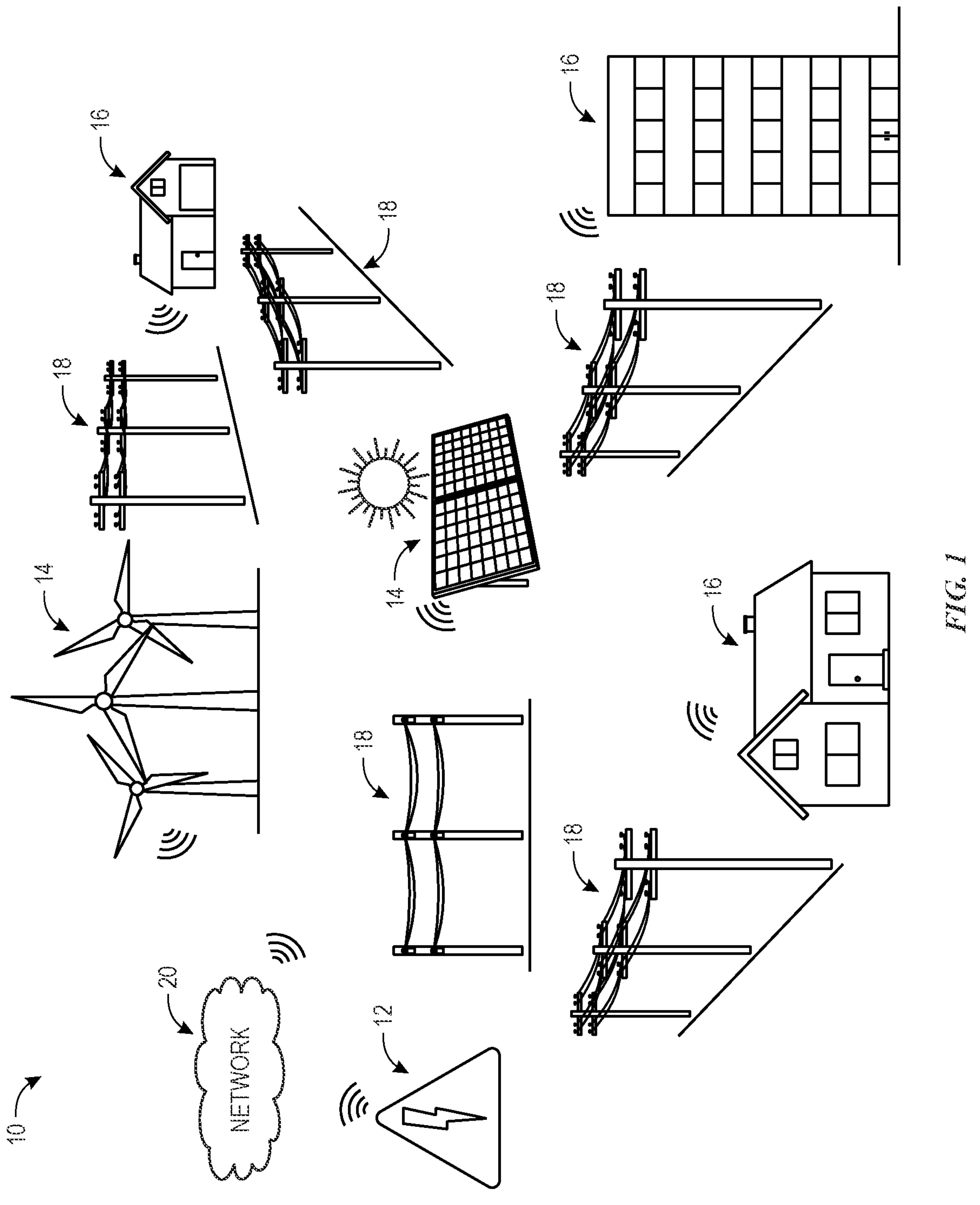
FIG. 1 is a schematic diagram of an electrical grid system including a variety of power sources and power consumers, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the control (e.g., closed-loop control) of the equipment. In addition, as used herein, the terms "automatic", "automated", "autonomous", and so forth, are intended to describe operations that are performed or are caused to be performed, for example by a computing system (i.e., solely by the computing system), without human intervention. Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of and benefits provided by the computing system (e.g., by not requiring human intervention, thereby facilitating faster operational decision-making, as well as improving the accuracy of the operational decision-making by, for example, eliminating the potential for human error), as described in greater detail herein.

In general, electrical power is provided to consumers such as homes and businesses via a power grid. The power grid is fed by one or more regional power stations and distributed via suspended or buried power lines. Additionally, in some scenarios, distributed power stations (e.g., localized power resources), which are typically smaller than large regional power stations may be interspersed within the power grid to provide additional electrical power, either on demand (e.g., when a power consumption is at an increased state) or continuously. Furthermore, power generation may be regulated based on current and/or expected usage to provide electrical power to the consumers.

However, power interruptions such as blackouts or brownouts may occur due when the available electrical power is less than the combined loads of the consumers. For example, power draw increases may be associated with environmental conditions (e.g., outside temperature, precipitation, lighting strikes, etc.), time of day, and so forth, while power supply reductions or limitations may be associated with power generation reductions (e.g., reduced solar or wind availability for harnessing, generator failures, off-lining for maintenance, etc.), and/or power line failures (e.g., downed or severed power lines). Such power interruptions oftentimes result in unexpected issues and/or poor end user experiences. Furthermore, such issues may continue to be exasperated in the future due to the overall increase in power consumption over time in many areas, such as growing metropolitans, suburbs, etc. As such, it may be desired to reduce or eliminate overdraw of electrical power from the power grid.

However, simply shutting down portions of the power grid to reduce large scale power interruptions, such as with rolling blackouts or brownouts, may still leave some consumers entirely without electrical power. Moreover, voluntary reduction of consumer usage may not be enough to reduce the overall power draw on the power grid. As such, a power management system capable of turning off individual loads of a single consumer may assist in reducing the overall draw on the power grid while maintaining at least some supply of electrical power to the consumers. For example, the power management system may control smart breakers (e.g., electronically controlled breaker switches), smart controllers (e.g., breakers or switches separate from the main breakers), and/or individual smart loads (e.g., connected devices, smart home devices, etc.) to reduce a draw of the consumer. In other words, the power management system may reduce the individual loads of all or a portion of the consumers to maintain uninterrupted supply to consumers that may have otherwise experienced a power interruption.

Additionally, in some embodiments, the power management system may include an artificial intelligence (AI) module (or multiple such AI modules provided in sequence and/or parallel) to "learn" the typical power usages, power consumption traits, and/or criticality or preference for certain loads to create custom load reduction plans or select from a list of genericized load reduction plans for the consumer. For example, the AI module may strategically select which loads of a consumer to maintain or reduce based on user feedback (e.g., a set of user preferences), sensor feedback from electrical power consumption, and/or settings of smart loads (e.g., electronically controllable loads such as smart thermostats, smart switches, smart appliances, etc.). Furthermore, the AI module may be supplied with classifications for or learn to classify certain loads as being more or less critical. For example, loads used for medical purposes or food preservation may be given higher priority than convenience or entertainment loads etc. As such, load reduction plans may be generated/selected on a consumer-by-consumer basis to reduce an overall draw on the power grid and/or reduce a likelihood of power interruptions for the consumers.

In some embodiments, the power management system may also include an assessment module for determining product/service offerings, recommendations, and/or risk analysis for individuals associated with the consumer and/or a structure of the consumer. For example, the assessment module may analyze user preferences and/or feedback signals indicative of load usages to provide discounts and/or advertising for products or services and/or to define a risk factor, such as for insurance purposes, regarding the individuals associated with the consumer and/or a structure of the consumer.

With the foregoing in mind, FIG. 1 is a schematic diagram of a power grid 10 including a variety of power sources (e.g., regional power stations 12 and/or distributed power stations 14) and power consumers 16. In general, electrical power is generated via power stations, such as regional power stations 12 and/or distributed power stations 14, and provided to the consumers, such as homes and businesses, via power lines 18 (e.g., suspended from poles or buried). As should be appreciated, the regional power stations 12 and/or distributed power stations 14 may be any suitable type of power station such as gas (e.g., natural gas), coal-fired, and/or nuclear-powered power plants, hydroelectric dams, solar-farms, wind-farms, etc. Moreover, regional power stations 12 are typically larger and more spaced out than distributed power stations 14, which may be more local to the consumers 16. Furthermore, in some scenarios, consumers may have local power production systems such as rooftop solar and/or wind systems for providing electrical power directly to the associated consumer 16 and/or to backfeed the power grid 10 if excess electrical power is generated, beyond the current consumption of the consumer 16. Additionally, as discussed herein, a consumer 16 may be any end user of the electrical power, and may be distinguished individually by a power meter, a user account of an electricity provider or distributer, or other metric. Moreover, a single consumer may be associated with one or multiple individual loads.

In some embodiments, the power sources (e.g., regional power stations 12 and/or distributed power stations 14) and/or consumers 16 may be communicatively coupled (e.g., via wireless or wired connections) via a network 20 such as the internet, a virtual private network, computing instance, etc. For example, regional power stations 12 and/or distributed power stations 14 may communicate with one another to regulate electric power production based on their production capabilities and/or the overall load of the power grid 10. As discussed above, power interruptions such as blackouts or brownouts may occur due when the generated electrical power is insufficient to power the combined loads of the consumers 16. As the production capabilities and overall load of the power grid 10 varies over time, a power buffer may be available to provide electrical power for added loads. Moreover, if the power buffer is reduced below a threshold amount, production may be increased at one or more power sources.

Figure 2:
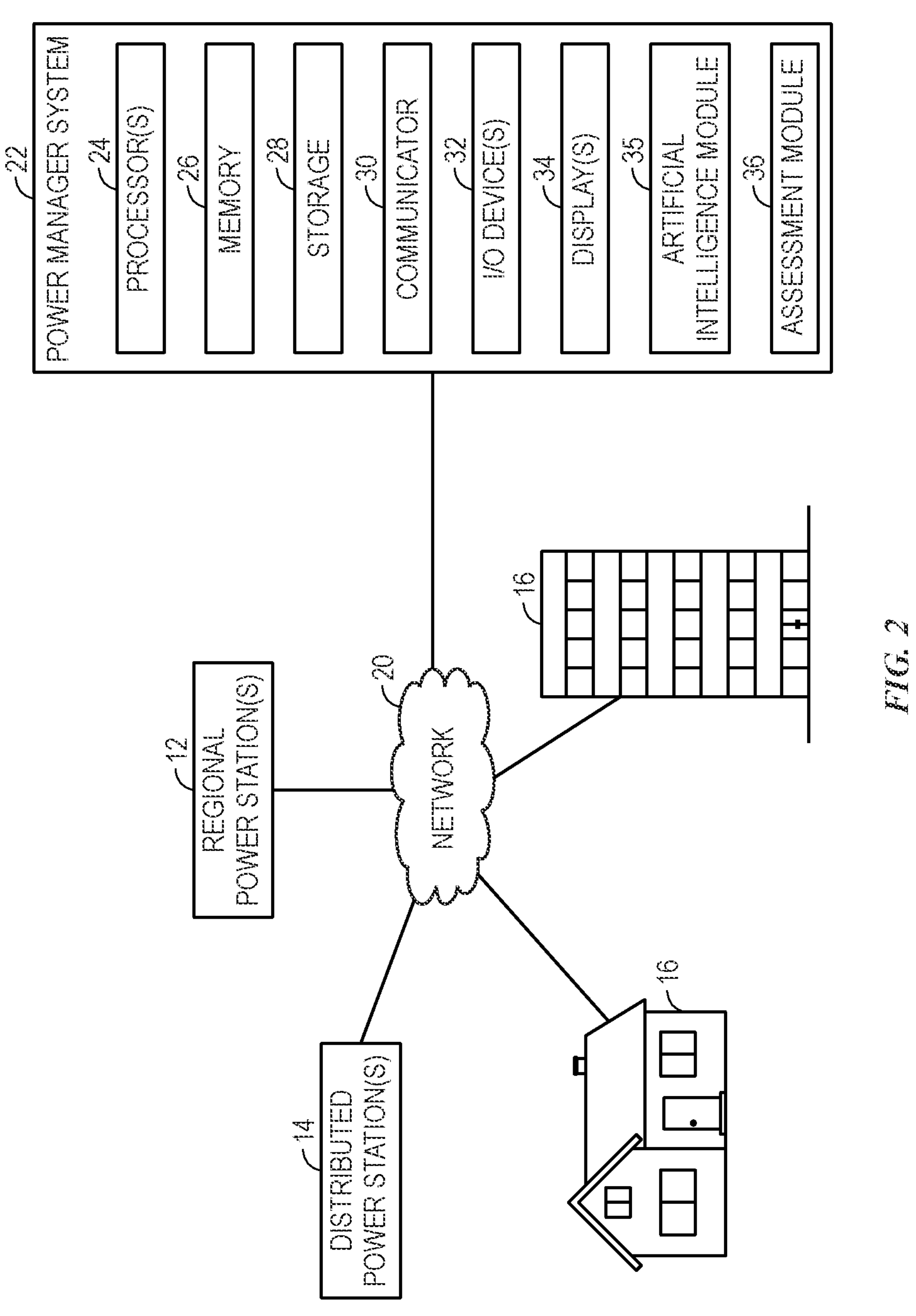
FIG. 2 is a schematic diagram of a power management system in conjunction with power sources and power consumers connected via a network, in accordance with aspects of the present disclosure.

However, if no additional production is available to provide the power buffer, such as each power source is operating at its current capacity, planned or unplanned power interruptions may occur. For example, portions of the power grid 10 may be intentionally, temporarily shut down to avoid a larger scale power interruption. Additionally or alternatively, a power management system 22 may be communicatively coupled to the network 20 to provide for load reductions at the consumers 16, as shown in the schematic diagram of FIG. 2. For example, the power management system 22 may control smart breakers (e.g., electronically controlled breaker switches), smart controllers (e.g., breakers or switches separate from the main breakers), and/or individual smart loads (e.g., connected devices, smart home devices, etc.) of a particular consumer 16 to reduce a load of that consumer 16. Such load reductions may allow for uninterrupted power to be maintained to the consumers 16.

The power management system 22 may include one or more processors 24, memory 26, storage 28, a communicator 30, one or more input/output (I/O) ports 32, and/or one or more displays 34. As should be appreciated, the processor(s) 24 may include hardware-based processor(s) having one or more cores and be single-threaded of multi-threaded, and process instructions stored in the memory 26 and/or storage 28. Moreover, the processor(s) 24 may include general purpose processor(s), special purpose processor(s), micro-processors, application specific integrated circuits (ASICs), field programmable gate arrays (FPGAs), or any combination thereof. Furthermore, such processor(s) may be considered in general as processing circuitry, which may be distributed across one or more computers, servers, and/or locations. Additionally, the memory 26 and storage 28 may be any suitable articles of manufacture that can serve as non-transitory media to store processor-executable code, data, etc. to perform the techniques disclosed herein. Furthermore, the power management system 22 may include a communicator 30, such as a wireless or wired communication component that may facilitate communication between power management system 22 and the network 20. The communicator 30 may use a variety of communication protocols, such as Open Database Connectivity (ODBC), TCP/IP Protocol, Distributed Relational Database Architecture (DRDA) protocol, Database Change Protocol (DCP), HTTP protocol, other suitable current or future protocols, or combinations thereof. Additionally, the I/O port(s) 32 may be interfaces that couple to other peripheral components such as input devices (e.g., keyboard, mouse), sensors, input/output (I/O) modules, smart devices, etc. Moreover, the display(s) 34 may operate as a human machine interface (HMI) to depict visualizations associated with software or executable code being processed by the processor 24. The display(s) 34 may be a touch display capable of receiving inputs, and/or include any suitable type of display, such as a liquid crystal display (LCD), plasma display, or an organic light emitting diode (OLED) display. Furthermore, the components of the power management system 22 may be maintained in a single location, such as at a location of a power source (e.g., a regional power stations 12 and/or a distributed power stations 14, energy provider/distributer, etc.) or at a location of a consumer 16, or distributed across multiple locations, including, but not limited to, cloud-based implementations. For example, the power management system 22 may have some components located at each consumer 16 and some disposed at a remote location, such as a central or cloud server. Moreover, the power management system 22 may be considered as a device of the consumer 16 and/or a utility operator (e.g., a regional power stations 12 and/or a distributed power stations 14, energy provider/distributer, etc.).

Additionally, as discussed herein, in some embodiments, the power management system 22 may include an artificial intelligence (AI) module 35 and/or an assessment module 36. As should be appreciated, the AI module 35 and/or assessment module 36 may utilize any of the processor(s) 24, memory 26, storage 28, or other components of the power management system 22 to execute the functions thereof. Moreover, while shown and discussed as separate modules, the assessment module 36 may utilize or be incorporated into the AI module 35.

In some embodiments, a single AI module 35 may be utilized, such as on a remote and/or central server, and/or an AI module 35 may be implemented for (e.g., disposed at and/or associated with a custom instance for) each consumer 16. As should be appreciated, the AI module 35 may utilize any suitable form of machine learning. Moreover, as used herein, machine learning may refer to algorithms and statistical models that cause one or more processors to perform a specific task with or without explicit instructions. For example, a machine learning process may generate a mathematical model based on a sample of data, known as "training data," in order to make predictions or decisions without being explicitly programmed to perform the specific task. Depending on the inferences to be made, different machine learning algorithms may be used to analyze the driving data.

In some embodiments, a supervised machine learning algorithm may be implemented using a mathematical model of a set of driving data samples referred to as "training data" and containing both inputs and desired outputs. Each driving data sample may include one or more inputs and corresponding desired one or more outputs, also known as supervisory signals. In the mathematical model, each driving data sample may be represented by an array or vector, sometimes called a feature vector, and the training data may be represented by a matrix. Through iterative optimization of an objective function, the supervised machine learning algorithm may learn a function (e.g., optimal function) that can be used to predict outputs associated with new inputs. That is, the optimal function may allow the supervised machine learning algorithm to correctly predict corresponding outputs for certain inputs that are not presented in the training data. Such an algorithm that improves the accuracy of its outputs or predictions over time is said to have learned to perform the specific task. Supervised learning algorithms may include classification and regression. Classification algorithms are used when the outputs are restricted to a limited set of values, and regression algorithms are used when the outputs may have any numerical value within a range. Similarity learning is an area of supervised machine learning closely related to regression and classification, but the goal is to learn from examples using a similarity function that measures how two objects (e.g. two sets of measured driving performance data from two different autonomous driving systems) are similar or related.

Additionally or alternatively, in some embodiments, an unsupervised machine learning algorithm may be implemented (e.g., when particular output types are not known). The unsupervised learning algorithm may take a set of driving data samples that contains only inputs, and find structure in the driving data samples, such as grouping or clustering of the driving data samples. The unsupervised learning algorithm, therefore, learns from the driving data samples that have not been labeled, classified, or categorized. Instead of responding to feedbacks, unsupervised learning algorithms identify commonalities in the driving data and react (e.g., predict outputs) based on the presence or absence of such commonalities in each new piece of driving data. Cluster analysis is the assignment of a set of observations (e.g., on driving data samples) into subsets (called clusters) so that observations within the same cluster are similar according to one or more predesignated criteria (e.g., driving conditions), while observations drawn from different clusters are dissimilar. Different clustering techniques make different assumptions on the structure of the driving data, often defined by some similarity metric and evaluated, for example, by internal compactness, or the similarity between autonomous driving systems or autonomous driving algorithms of the same cluster.

Using such techniques, the AI module 35 may "learn" the typical power usages, power consumption traits, and/or criticality or preferences for certain loads to create custom load reduction plans or select from a list of genericized load reduction plans for the consumer 16. As should be appreciated, while discussed herein as utilizing the AI module 35, in some embodiments, the power management system 22 may utilize any suitable programming, such as digital or analog logic (e.g., if, then, else, for, while, etc.) algorithms, to generate, select, and/or implement a load reduction plan for a consumer 16.

Figure 3:
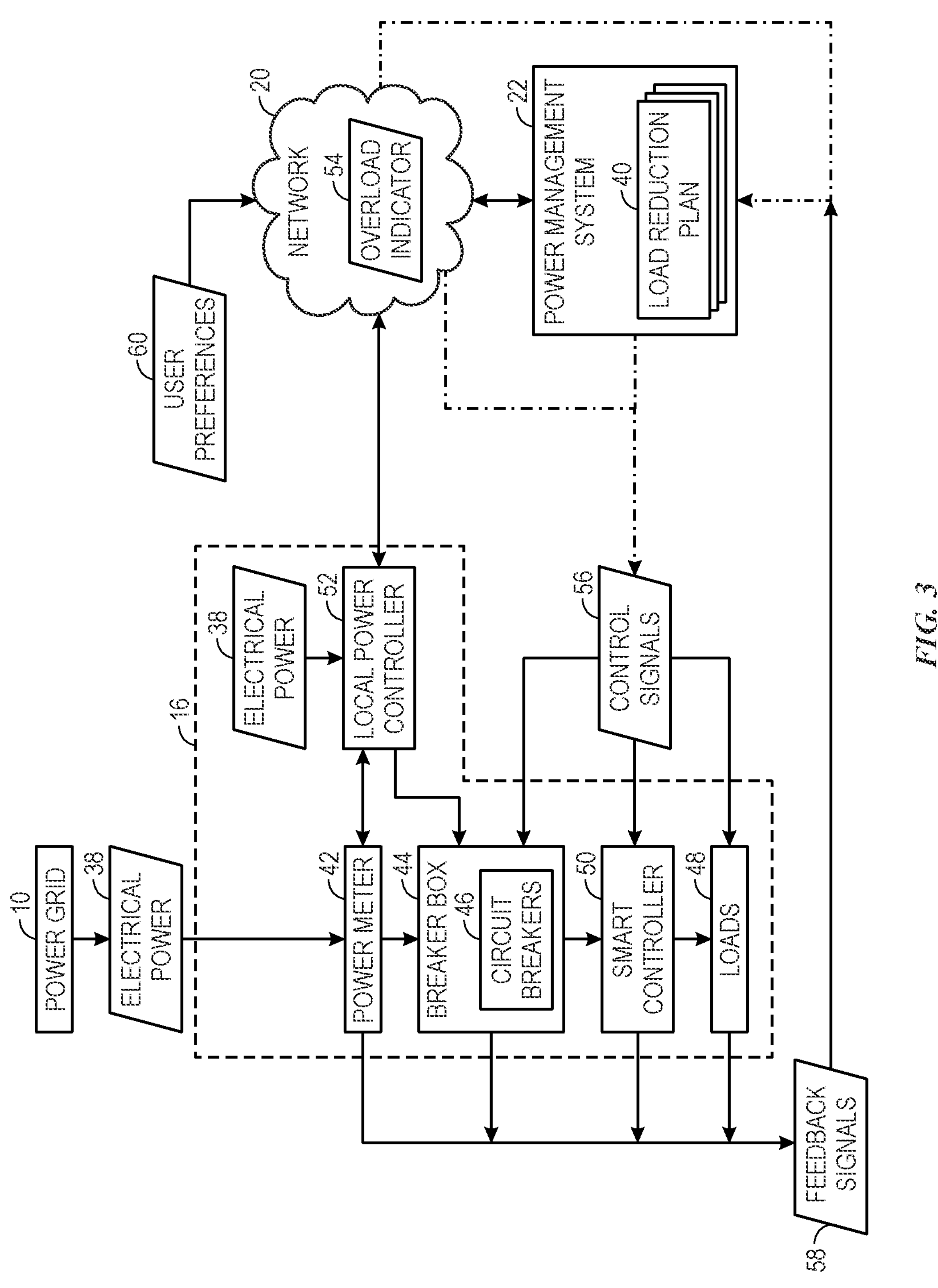
FIG. 3 is a flow diagram of a power consumer in conjunction with a power management system that reduces a draw of electrical power based on a load reduction plan, in accordance with aspects of the present disclosure.

To help illustrate, FIG. 3 is a flow diagram of a consumer 16 in conjunction with a power management system 22 that may reduce a draw of electrical power 38 of the consumer based on a load reduction plan 40. During operations where load reduction is not implemented, electrical power 38 may be received by a consumer 16 via the power grid 10. In some scenarios, a power meter 42 may define an entry point for the electrical power 38 to the consumer 16. For example, the power meter 42 may compute an amount of electrical power 38 delivered to the consumer 16, via the power grid 10. Additionally, the electrical power 38 may be regulated via a breaker box 44 having one or more circuit breakers 46 that enable or disable a flow of the electrical power 38 to loads 48 of the consumer 16. Additionally, the circuit breakers 46 may provide overcurrent protections by automatically disabling in response to the current therethrough exceeding a threshold amount in a period of time. Furthermore, the loads 48 of the consumer 16 are devices that utilize the electrical power 38. For example, loads 48 may include lights, household appliances, entertainment equipment, heating, ventilation, and air conditioning (HVAC) equipment, medical equipment, computing devices, pumps, and/or electric motors, to name a few. Furthermore, transmission and regulation circuitry, such as the power meter 42, breaker box 44, wiring, switches (e.g., smart switches), etc. may also be associated with power losses, such as energy lost as heat as the electrical power 38 passes therethrough. As discussed further below, the power management system 22 may monitor the draw of electrical power 38 of a consumer 16, and such losses may be factored into the load reduction plans 40 or ignored as insignificant.

As should be appreciated, each circuit breaker 46 may regulate electrical power 38 to one or more loads 48. For example, a circuit breaker 46 may regulate electrical power 38 to a set of lights which may be controlled in groups or individually by one or more switches. Similarly, a circuit breaker 46 may regulate electrical power 38 to a set of electrical outlets providing electrical power 38 to one or more devices plugged into the electrical outlets. Additionally, in some embodiments, smart controllers 50 may be utilized to remotely control (e.g., via a home network, the internet, the network 20, wireless device, connected device, etc.) loads 48. For example, such smart controllers 50 may include but are not limited to smart switches, smart outlets, and smart thermostats. Moreover, in some scenarios, the smart controllers 50 may be implemented as part of a smart home ecosystem.

Additionally, in some embodiments, electrical power 38 may be locally generated at a consumer 16, such as via solar panels (e.g., roof or ground mounted solar panels), wind turbines, and/or generators (e.g., natural gas generator, propane generator, etc.). A local power controller 52 may regulate the integration of the locally generated electrical power 38 with the electrical power 38 from the power grid 10 to be utilized by the consumer 16. Moreover, in some scenarios, the locally generated electrical power 38 may be routed back to the power grid 10, such as if the locally generated electrical power 38 is greater than a present power draw of the loads 48.

As discussed above, in some scenarios, the power grid 10 may encounter an overall power draw that triggers an overload condition, such as the overall power draw meeting a current maximum electrical power availability, exceeding the current maximum electrical power availability, and/or encroaching upon a buffer between the overall power draw and the current maximum electrical power availability. For example, the overall power draw of the power grid 10 may exceed a threshold amount and/or the buffer may be reduced beyond a threshold amount. As should be appreciated, such amounts and/or thresholds may be considered as amounts of electrical power (e.g., in kilowatt-hours, megawatt-hours, etc.), percentages based on the current maximum electrical power availability, or other metric comparing the overall power draw to the current maximum electrical power availability. Furthermore, while discussed herein as an overall power draw, as should be appreciated, the overload condition, and the techniques for mitigating the overload condition discussed herein, may be localized to one or more portions of the power grid 10, such as based on the capabilities of the corresponding infrastructure for those portions of the power grid 10. As such, as used herein, the term overall power draw may refer to the cumulative power draw for any set/subset of one or more consumers 16 that may cause an overload condition for a corresponding portion of the power grid 10.

In some embodiments, an indication of the overload condition (e.g., overload indicator 54 may be communicated to the power management system 22 by a power source (e.g., regional power station 12, distributed power station 14, energy provider/distributer, etc.) or the overload indicator 54 may be generated by the power management system 22, which may monitor aspects of the power grid 10. Indeed, as discussed herein, the power management system 22 may be distributed (e.g., via sensors, processors, and/or controllers) across multiple power sources and/or consumers 16 of the power grid 10. Furthermore, in some embodiments, the power management system 22 may be implemented on one or more servers, such as in a cloud-based instance, and communicate with sensors and/or controllers distributed across the power grid 10. Additionally or alternatively, an energy monitor (e.g., of a regional power station 12, distributed power station 14, energy provider/distributer, etc.) may identify the overload condition and communicate the overload indicator to the power management system 22, such as via the network 20. Moreover, although depicted as separate from the consumer 16 in FIG. 3, in some embodiments, each consumer 16 may have a stand-alone power management system 22 disposed at the location of the consumer 16 that can receive the overload indicator 54, such as via the network 20.

Based on the overload indicator 54, the power management system 22 may implement a load reduction plan 40 for a consumer 16 to reduce the associated power draw on the power grid 10. For example, the power management system 22 of each consumer 16 may receive an overload indicator 54 and implement a respective load reduction plan 40 or a central power management system 22 may implement load reduction plans 40 for each of multiple consumers 16.

Additionally, in some embodiments, the overload indicator 54 may include a severity (e.g., a quantitative metric and/or qualitative score or indicator) of the overload condition, which may change the load reduction plan 40 to be implemented. For example, an overload condition associated with the overall power draw of the power grid 10 meeting or exceeding a current maximum electrical power availability may have a higher severity than an overload condition associated with the overall power draw encroaching upon a buffer between the overall power draw and the current maximum electrical power availability. Moreover, if an overload condition was already indicated, and load reduction plans 40 implemented, and an overload condition still exists, the severity of the overload indicator 54 may be increased, such as via a control feedback loop, until the overload condition is no longer present. As such, in some scenarios, different load reduction plans 40 may be implemented at a particular consumer 16 in response to overload indicators 54 with different severities to further reduce the power draw of the consumer 16.

To implement the load reduction plans 40, the power management system 22 may provide (e.g., via a wired or wireless connection and/or a network 20 such as the internet) control signals 56 to the breaker box 44 (e.g., to control individual circuit breakers 46), smart controllers 50, and/or directly to one or more loads 48. For example, one or more of the circuit breakers 46 within the breaker box 44 may be smart breakers (e.g., electronically controllable circuit breakers), and the power management system 22 may send a control signal 56 to turn off one or more of the smart breakers. Additionally, the power management system 22 may send control signals 56 to one or more smart controllers 50 to turn off or reduce the utilization of their associated loads 48 and/or enter a specific mode (e.g., power saving mode). For example, the control signals 56 may direct a smart switch or smart outlet to turn off, direct an HVAC system to close vents to unused rooms, and/or direct electronically controlled blinds to open or close (e.g., depending on the season, outside temperature, and/or set-point) to help manage temperature efficiency. Further, the control signals 56 may direct an HVAC thermostat to turn off the HVAC system and/or change a temperature setting (e.g., a set-point) such that the HVAC system may continue to operate but at a reduced utilization. Moreover, in some scenarios, one or more of the loads 48 may be electrically controllable via the control signal 56. For example, connected devices such as smart speakers, smart televisions, smart bulbs, etc. may be directly controlled via the power management system 22 to be turned off in response to the overload indicator 54. Additionally, feedback signals 58 from the power meter 42, breaker box 44 (e.g., circuit breakers 46), smart controllers 50, and/or loads 48 may be provided (e.g., via a wired or wireless connection and/or a network 20 such as the internet) to the power management system 22 to indicate a current power draw and/or state of the consumer 16 (e.g., overall power draw of the consumer 16 and/or individual power draws and/or states of the loads 48, smart controllers 50, and/or circuit breakers 46).

In some embodiments, the power management system 22 may select a suitable load reduction plan 40 from a set of load reduction plans 40 depending on the severity of the overload indicator 54 and/or feedback signals 58 indicating the current power draw and/or state of the consumer 16. For example, for a given severity, certain types of loads 48, which may be designated as having a low criticality, may be affected (e.g., turned off or set to a reduced power draw setting). Moreover, at higher severities, loads 48 with medium criticality may be affected. As discussed further below, the criticality of the loads 48 may be based on user preferences 60, individual power draws of the loads 48, and/or the purpose (e.g., medical, entertainment, safety, household, etc.) of the load 48 to name a few. Furthermore, in some scenarios, some loads 48 may be designated as high criticality loads 48, such as medical or safety equipment and/or devices deemed as high priority in a user preference 60, and electrical power 38 may be maintained to the high criticality loads 48 regardless of the load reduction plan 40. As further examples, in some embodiments, smart outlets (e.g., individually controllable power outlets or groups of power outlets), may have individual priorities (e.g., of a user preference) and/or individual criticalities. For example, smart outlets used primarily for charging (e.g., providing power to phone, tablet, or other device chargers) may be given a lower criticality, as such devices may be associated with an increased likelihood of leeched (e.g., wasted) power. Furthermore, smart outlets providing power to food storage (e.g., refrigerators, freezers, etc.) or medical devices may be given individual and higher criticalities, whereas a smart outlet, circuit breaker 46 (e.g., smart breaker), or smart controller 50 of a swimming pool pump may be given lower criticality. Furthermore, in some embodiments, the smart outlets may have indicator lights to indicate their state (e.g., on or off) and/or criticality (e.g., priority level within the load reduction plan 40). As such, it may be visually recognizable by a user, which outlets are available or would be available during implementation of a load reduction plan 40. Moreover, in some embodiments, the smart outlet may include an override switch to enable power to devices plugged into the smart outlet.

Additionally or alternatively, each consumer 16 may be assigned a power budget, which may vary based on the severity of the overload indicator 54. For example, the power management system 22 may select a load reduction plan 40 that reduces the power draw of the consumer 16 to less than the power budget, for example by starting load reduction with low criticality loads 48 and continuing until the power draw is less than the power budget. As should be appreciated, in some scenarios, electrical power 38 may be maintained to high criticality loads 48 even if the power budget is exceeded. The power budget may be uniform across multiple consumers 16 or determined based on an average electrical power utilization of the consumer 16, a size (e.g., square footage) of one or more structures associated with the consumer 16, and/or a number of people (e.g., number of residents, tenets, expected current customers, etc.) associated with the consumer 16. Furthermore, if locally generated electrical power 38 is available, such electrical power 38 may be considered separately from the power budget, such that the power budget from the power grid 10 is available in addition to the locally generated electrical power 38, or considered as part of the power budget, such that the overall power draw of the consumer 16 (e.g., electrical power 38 from the power grid 10 and the locally generated electrical power 38) is within the power budget.

As discussed above, some loads 48 may be designated as having a high criticality and may not be affected by the power management system 22. Moreover, in some embodiments, a user may utilize an I/O device 32 and/or display 34 of the power management system 22 and/or connect to the power management system 22 via a personal computer (e.g., via the network 20 and/or internet or home network), such as via a communicator 30, to override or re-configure the load reduction plan 40. Moreover, the power management system 22 may utilize an I/O device 32, communicator 30, and/or display 34 to notify a user, in advance of and/or during implementation of the load reduction plan 40. Such a notification may also include an approval request to implement the load reduction plan 40. For example, the power management system 22 may implement the load reduction plan 40 after receiving approval from the user and/or implement the load reduction plan 40 after a period of time of no response from the user, and/or not implement the load reduction plan 40 if the user provides a denial response. Additionally or alternatively, the power management system 22 may provide multiple load reduction plans 40 to the user, and the user may select to implement one or none of the listed load reduction plans 40.

When the severity of the overload condition is reduced (e.g., the overall power draw of the power grid 10 is less than the current maximum electrical power availability by a threshold amount or the buffer is greater than a threshold amount) the severity of the overload indicator 54 may be reduced. In response to a reduced severity of the overload indicator 54, the power management system 22 may direct control signals 56 to restore electrical power 38 to at least a portion of the loads 48, for example, starting with loads 48 having the highest criticality. Furthermore, when the overload condition is eliminated, the overload indicator 54 may be revoked and/or an all-clear indicator (not shown) may be provided, and electrical power 38 may be restored to the loads 48 based thereon.

Figure 4:
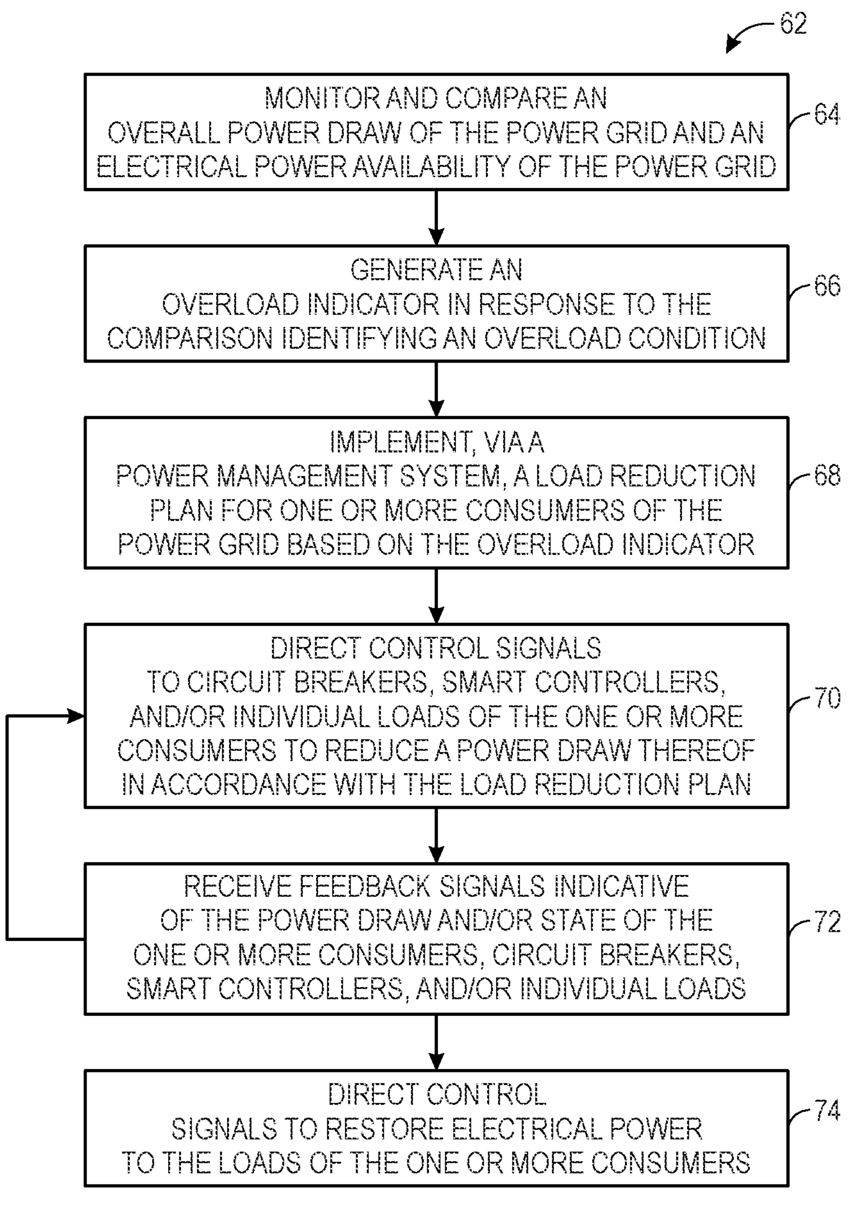
FIG. 4 is a flowchart of an example process for implementing a load reduction plan for the power consumer of FIG. 3, in accordance with aspects of the present disclosure.

To help illustrate, FIG. 4 is a flowchart of an example process 62 for implementing a load reduction plan 40 for a consumer 16. First, an overall power draw of the power grid 10 and an electrical power availability of the power grid may be monitored and compared (process block 64). Additionally, an overload indicator may be generated in response to the comparison identifying an overload condition (process block 66). A power management system 22 may implement a load reduction plan 40 for one or more consumers 16 of the power grid 10 based on the overload indicator 54 (process block 68). Furthermore, the power management system 22 may direct control signals 56 to circuit breakers 46, smart controllers 50, and/or individual loads 48 of the one or more consumers 16 to reduce a power draw thereof in accordance with the load reduction plan 40 (process block 70). Additionally, feedback signals 58 indicative of the power draw and/or state of the one or more consumers 16, circuit breakers 46, smart controllers 50, and/or individual loads 48 may be received via the power management system 22 (process block 72). Based on the feedback signals 58, additional control signals 56 may be sent to the circuit breakers 46, smart controllers 50, and/or individual loads 48 of the one or more consumers 16 to reduce the power draw thereof (process block 70). In response to the revocation of the overload indicator 54 and/or an all-clear indicator, the power management system 22 may direct control signals 56 (e.g., to the circuit breakers 46, smart controllers 50, and/or individual loads 48 of the one or more consumers 16) to restore electrical power 38 to the loads 48 of the one or more consumers 16 (process block 74).

As discussed above, the power management system 22 may implement a load reduction plan 40 to reduce the power draw of a consumer 16. However, it may be difficult to determine which loads 48 are to be affected by the load reduction plan 40. For example, standardized load reduction plans 40 may result in some loads 48 being affected that negatively affect an end user experience and/or result in some loads 48 being left unaffected that could be turned off without affecting end user experience. As such, in some embodiments, the AI module 35 of the power management system 22 may generate one or more customized load reduction plans 40 and/or modify standardized load reduction plans 40 to provide an improved load reduction plan implementation.

For example, the AI module 35 may strategically select which loads 48 of a consumer 16 to maintain or reduce electrical power 38 to based on user preferences 60, feedback signals 58 (e.g., from the power meter 42, circuit breakers 46, smart controllers 50, and/or individual loads 48), load reduction plans 40 utilized for neighboring consumers 16, and/or environmental data (e.g., weather data). For example, the AI module 35 may be supplied with (e.g., via the user preferences 60) classifications for and/or learn to classify certain loads as having a higher or lower criticality. Furthermore, the AI module 35 may determine a load purpose (e.g., medical, entertainment, safety, household, etc.) for the loads 48 based on the user preferences 60 and/or feedback signals 58 of the loads 48. For example, the feedback signals 58 may provide data that indicate the load 48 as being a medical device, which may increase the criticality of that load 48. Additionally, in some scenarios, criticality of similar loads 48 may be generally the same for other consumers 16 in the vicinity, and the AI module 35 may set criticalities (e.g., initially) based thereon.

In some embodiments, a user may supply the power management system 22 with a ranking (e.g., low, medium, or high) of priorities or criticalities for one or more loads 48 of the consumer 16. For example, the user may provide priorities for the loads 48, and the power management system 22 (e.g., via the AI module 35) may assign criticalities for the loads 48 based on the provided priorities and an evaluation of the feedback signals 58, which may indicate general power draws of the loads 48. Additionally or alternatively, the user may directly assign criticalities for one or more loads 48 of the consumer 16. Furthermore, in some embodiments, the power management system 22 may dynamically interact with the input user preferences 60 (e.g., via a graphical user interface displayed on the display 34 and/or on a user device, such as via the communicator 30 or hosted by the user device). For example, the user preferences 60 may be used in real-time to determine whether the user preferences 60 support a load reduction plan 40 that adequately (e.g., in accordance with a suggested, requested, or mandated power draw reduction and/or a power budget) reduces the power draw of the consumer 16. If the user preferences 60 do not support an adequate load reduction plan 40, the power management system 22 may provide an indication thereof and/or provide suggested changes to the user preferences 60 to achieve an adequate load reduction plan 40.

Furthermore, the AI module 35 may learn or otherwise be trained, based the typical load usage of a consumer 16, to determine the individual power draws of individual loads 48 and/or to automate the designation of the user preferences 60. Indeed, the AI module 35 may monitor the time of use and/or power draw of each load 48 to assign criticality. For example, loads 48 designated as having a lower priority (e.g., via the user preferences 60) and higher power draw may be designated as having the lowest criticality. Moreover, in some embodiments, instead of receiving a set of user preferences 60 (e.g., from a user), the AI module 35 may monitor the feedback signals 58 to learn which loads 48 are utilized most often and at what times of day to estimate the user preferences 60 and/or estimate the likelihood of use for a particular load 48 at a particular time.

Furthermore, the AI module 35 may utilize environmental data, such as weather information and/or physical properties (e.g., thermal properties of a structure) of the consumer 16 to adjust the loads 48 of a load reduction plan 40. For example, the AI module 35 may learn, over time, how a structure (e.g., home or business building) of the consumer 16 is heated and cooled in comparison to the outside temperature based on feedback signals 58 from a thermostat. As such, the AI module 35 may dynamically adjust the thermostat setting and/or turn off an HVAC system based on an outside temperature or other weather property (e.g., humidity, percent cloud cover, wind speed and/or direction, and so forth).

In some embodiments, the AI module 35 may dynamically alter which loads 48 are included in the implemented load reduction plan 40, such as based on a likelihood of use or actual use (e.g., by a user). Indeed, as the AI module 35 may learn (e.g., be trained on) the typical load usage of a consumer 16, as discussed above, the AI module 35 may also learn when certain loads 48 are typically utilized and adjust the load reduction plan 40 accordingly. For example, the load reduction plan 40 may be adjusted based on a likelihood of use in response to a time of day and/or feedback signals 58 (e.g., from the power meter 42, circuit breakers 46, smart controllers 50, and/or individual loads 48). Furthermore, the load reduction plan 40 may be adjusted while being implemented. In other words, the AI module 35 may shift loads 48 in real time, such as based on the behavior of one or more users associated with the consumer 16, time of day, and/or feedback signals 58. For example, the load reduction plan 40 may be adjusted based on behavior that indicates desired use of a currently powered down load 48. As a non-limiting example, if a user opens a microwave door, the priority and/or criticality of the microwave may be temporarily increased and power may be allocated to operate the microwave. Moreover, while the microwave is operating other loads 48 may remain in their current state or have their priority and/or criticality temporarily decreased and their power draw reduced for the duration of the microwave usage.

Additionally, in some embodiments, the power management system 22 (e.g., via the AI module 35) may schedule different load reductions of the load reduction plan 40. For example, two HVAC systems of a consumer 16 may be scheduled to run at separate times. Furthermore, in some embodiments, the power management systems 22 of two different consumers 16 (e.g., via a centralized power management system 22 or multiple power management systems 22 in communication with one another) may include scheduling of loads 48 to alternate amongst different consumers 16. For example, an HVAC system of a first consumer 16 and an HVAC system of a second consumer 16 (neighboring or not) may be scheduled to run at separate times. Moreover, as stated above, in some embodiments, the AI module 35 may dynamically alter loads 48 of the load reduction plan 40 (e.g., based on a likelihood of use). Such dynamic altering of the loads 48 may also lead to dynamic scheduling of loads 48, inter-consumer and/or intra-consumer.

Furthermore, in some embodiments, the AI module 35 may adapt (e.g., be retrained) based on user feedback. For example, a user may identify to the power management system 22 that a particular load 48 should have a different criticality than currently assigned, and the criticality may be updated accordingly. Moreover, loads 48 deemed similar by the AI module 35 may be automatically given a similar criticality. Furthermore, the user feedback may be received directly, such as via a communicator 30, I/O device 32, and/or display 34 or indirectly, such as via a user change to a state of a load 48 affected by the load reduction plan 40. For example, if a user adjusts an HVAC setting after the load reduction plan 40 has turned off or limited HVAC usage, the AI module 35 may reevaluate the criticality of the HVAC system (e.g., for the given environment, time of day, and/or other parameters). As should be appreciated, HVAC systems are merely used above as example loads 48, and any suitable loads 48 may be dynamically scheduled, adjusted based on environmental data, and/or reevaluated based on user feedback.

Additionally, in some embodiments, the load reduction plan 40 may be implemented as part of a test mode. For example, a user may enable the test mode to visualize and/or experience the effects of the load reduction plan 40 without the power grid 10 undergoing the overload condition (e.g., without the power management system 22 receiving the overload indicator 54). In other words, the overload condition may be simulated to prompt the load reduction plan 40 to be implemented. Additionally or alternatively, the user may manually enable the load reduction plan 40 to reduce the power draw of the associated consumer 16. Furthermore, in some embodiments, the test mode may simulate the load reduction plan 40 with or without disabling the loads 48. For example, which circuit breakers 46, smart controllers 50, and/or individual loads 48 would be disabled and/or have their power draw reduced in accordance with the current load reduction plan 40 may be shown to a user (e.g., via a display 34 of the power management system 22 and/or personal device in communication with the power management system 22).

Figure 5:
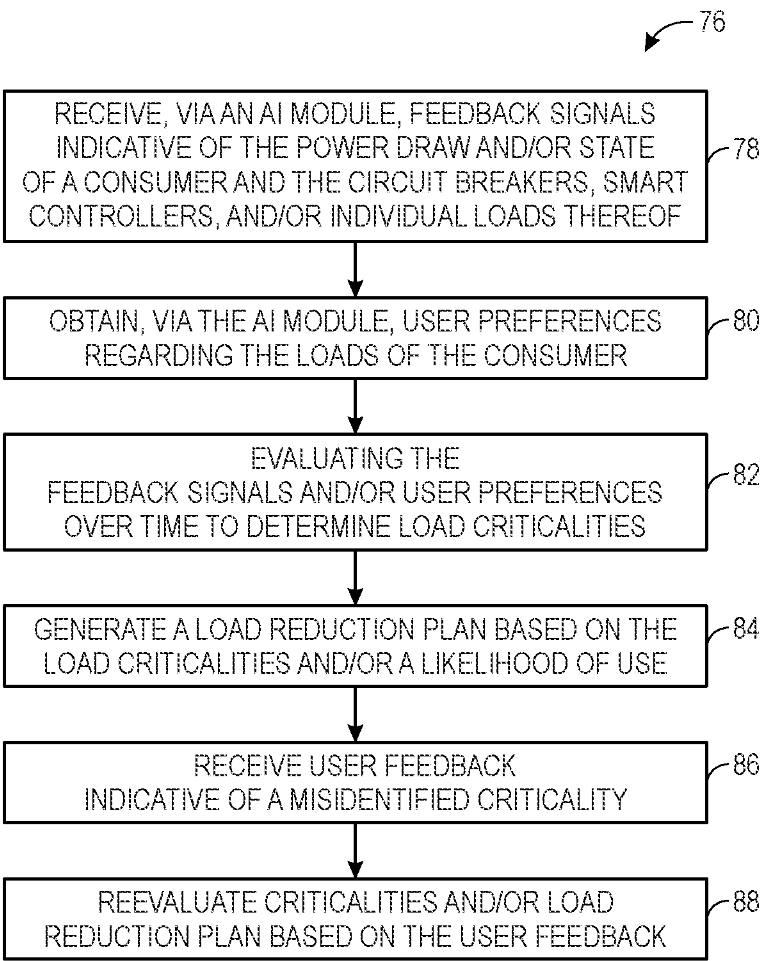
FIG. 5 is a flowchart of an example process for developing a load reduction plan via an AI module of the power management system of FIG. 3, in accordance with aspects of the present disclosure.

To help illustrate, FIG. 5 is a flowchart of an example process 76 for developing a load reduction plan 40 via an AI module 35 of a power management system 22. In some embodiments, the AI module 35 may receive feedback signals 58 indicative of the power draw and/or state of a consumer 16 and the circuit breakers 46, smart controllers 50, and/or individual loads 48 thereof (process block 78). Furthermore, the AI module 35 may obtain user preferences 60 regarding the loads 48 of the consumer 16 (process block 80). For example, the AI module 35 may receive the user preferences 60 or a portion thereof via input (e.g., via a communicator 30, an I/O device 32, and/or a display 34) from a user. Additionally or alternatively, the AI module 35 may determine the user preferences 60 or a portion thereof by analysis of the feedback signals 58. Furthermore, the AI module 35 may evaluate the feedback signals 58, for example in conjunction with the user preferences 60, to determine criticalities for the loads 48 (process block 82). The power management system 22 (e.g., via the AI module 35) may also generate a load reduction plan 40 based on the load criticalities and/or a likelihood of use (process block 84), such as a likelihood of use at the time of implementation of the load reduction plan 40. Moreover, in some scenarios, direct and/or indirect user feedback may be received indicative of a misidentified criticality (process block 86), and the AI module 35 may be reevaluate the criticalities of the loads 48 and/or the load reduction plan(s) 40 based on the user feedback (process block 88).

Additionally, in some embodiments, an assessment module 36 of the power management system 22 may analyze the user preferences 60 (e.g., received from a user and/or determined via the AI module 35) and/or analyze the feedback signals 58 to determine product/service offerings, recommendations, and/or a risk analysis for/of individuals associated with the consumer 16 and/or a structure associated with the consumer 16. Indeed, such analysis may provide insight into the lifestyles, interests, and/or potential liabilities of individuals associated with (e.g., residing or working at) the consumer 16 and/or a structure associated with the consumer 16. As should be appreciated, in some embodiments, the assessment module 36 may be a part of or separate from the AI module 35. Moreover, the assessment module 36 may directly or indirectly analyze the feedback signals 58 of the consumer 16 to determine usages of different loads 48 therefrom or indirectly analyze the feedback signals 58 such as by receiving usage information from the AI module 35. Additionally, the assessment module 36 may utilize any information available to the power management system 22, such as environmental data.

The assessment module 36 may analyze the user preferences 60 and/or feedback signals 58 to determine what types (e.g., medical, computing, entertainment, safety, laundry, cooking, food storage, power tool, HVAC, lighting, etc.) of devices (e.g., loads 48) are used by individuals associated with the consumer 16. In some scenarios, such as when the feedback signals 58 are communicated directly from a load 48 to the power management system 22, the assessment module 36 may also determine a specific model of the device (e.g., load 48). Moreover, the feedback signals 58 may provide the assessment module 36 (e.g., directly or indirectly) with usage information, indicating the power draw of such devices. The power draw of such devices may also provide indications of an extent to which the devices are used by a user. Based on an analysis of the user preferences 60 and feedback signals 58, the assessment module 36 may generate a user profile populated with different associations and/or behaviors.

Associations made be determined between a user of a consumer 16 and types or models of devices (e.g., loads 48). For example, if a load 48 associated with a cooking appliance such as a microwave oven is utilized (e.g., based on a power draw of the associated load 48), the assessment module 36 may populate a user profile (e.g., of a user associated with the consumer 16) with a cooking association (e.g., a general cooking association and/or a microwave oven cooking association with or without model specificity). Furthermore, associations may have levels that are set or dynamically adjustable based on how often the corresponding types of devices are used over time. For example, if the microwave oven is used several times per day, the association level for a general cooking association and/or a microwave oven cooking association may be increased relative to a consumer 16 associated with a microwave oven usage of once per week. Additionally, the priority that users may assign to such loads 48 (e.g., devices), such as in the user preferences 60, may be used to determine and/or augment the associations. For example, a user preference 60 that indicates a load 48 corresponding to a television as having a higher priority, may cause the assessment module 36 to increase the association level of an entertainment association and/or a television association of the user profile.

Furthermore, behaviors may be generated for a user profile based on how (e.g., in what context, time, or relative quantity) the loads 48 are utilized. Indeed, the assessment module 36 may use behaviors to estimate a lifestyle, cautiousness, and/or disposition of a user. For example, if cooking devices are rarely utilized, the behaviors of the user profile might indicate that the user eats out or orders delivery/takeout more often than preparing a homecooked meal. Furthermore, if an outside temperature indicates freezing weather, and the HVAC setting is not set to provide heating, the behaviors of the user profile may indicate less cautiousness and/or indicate a higher risk factor (e.g., tolerance to the risk of frozen/burst pipes).

The associations and behaviors of the user profile may be utilized by the assessment module 36 or sent to other agencies to provide the user with tailored product/service offers and/or recommendations. For example, a user with a user profile having a higher-level cooking association may be provided with cookware offers (e.g., discounts, advertisements, etc.). Moreover, a user with a user profile having a higher-level HVAC association may be provided with a recommendation for a more energy efficient HVAC system.

Furthermore, the assessment module 36 may also define one or more risk factors associated with the user profile, which may be shared with one or more financial and/or insurance institutions. For example, associations and behaviors that indicate a healthier lifestyle may be sent to an insurance institution for adjusting a health insurance premium. Furthermore, the risk factors may also be utilized in determining or augmenting a credit rating (e.g., credit score) and/or an interest rate, such as via a financial institution. Moreover, risk factors may also be associated with structures of the consumer 16. For example, as indicated above, a risk factor may indicate an increased risk for frozen and/or burst pipes within a structure of the consumer 16 if heating is forgone in freezing weather, and such increased risk may be factored into an insurance premium for the structure. Moreover, such financial and/or insurance institutions may provide product/service offerings or suggestions based on the risk factor.

Figure 6:
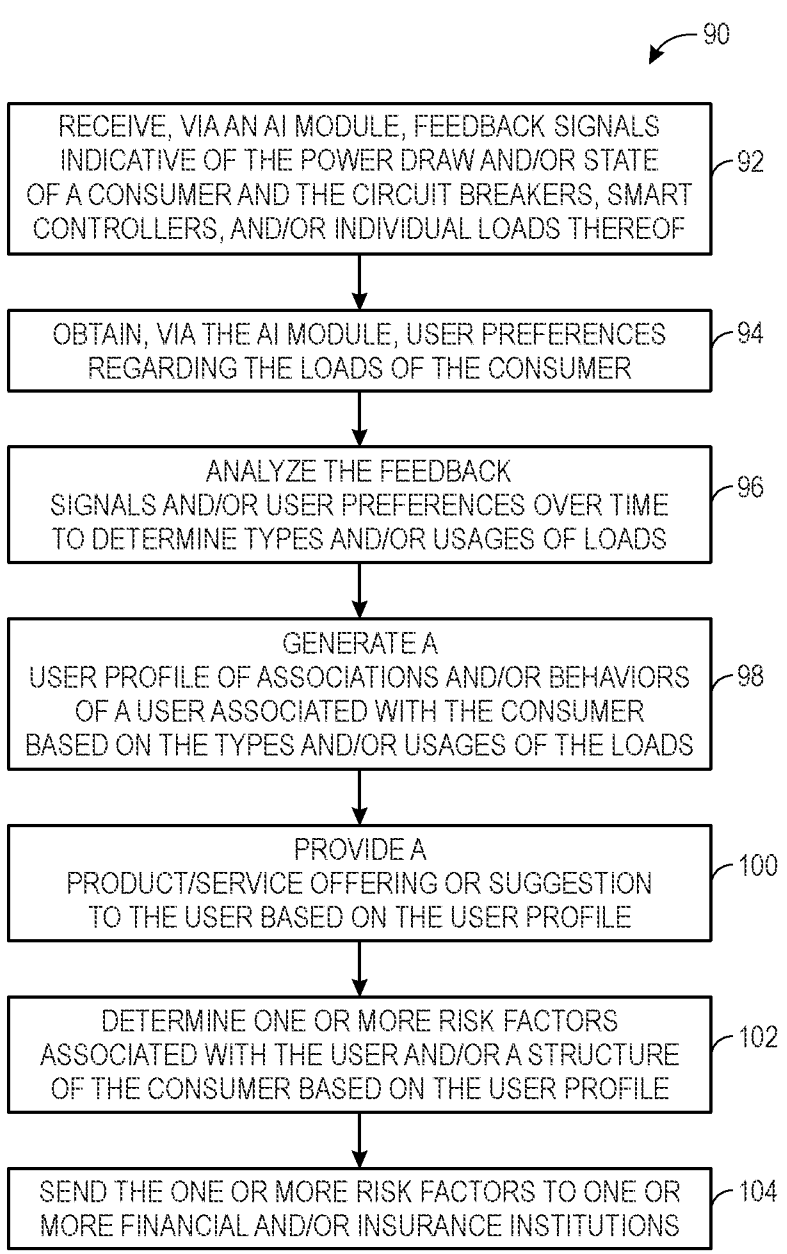
FIG. 6 is a flowchart of an example process for utilizing an assessment module to provide product/service offerings, recommendations, and/or risk factors for an individual and/ or structure associated with a consumer of FIG. 3, in accordance with aspects of the present disclosure.

With the preceding in mind, FIG. 6 is a flowchart of an example process 90 for utilizing an assessment module 36 to provide product/service offerings, recommendations, and/or risk factor(s) for individuals associated with the consumer 16 and/or structure(s) associated with the consumer 16. In some embodiments, the assessment module 36 may receive feedback signals 58 indicative of the power draw and/or state of a consumer 16 and the circuit breakers 46, smart controllers 50, and/or individual loads 48 thereof (process block 92). Furthermore, the assessment module 36 may obtain user preferences 60 regarding the loads 48 of the consumer 16 (process block 94). For example, the assessment module 36 may receive the user preferences 60 or a portion thereof via input (e.g., via a communicator 30, an I/O device 32, and/or a display 34) from a user. Additionally or alternatively, the assessment module 36 (e.g., via the AI module 35) may determine the user preferences 60 or a portion thereof by analysis of the feedback signals 58. Furthermore, the assessment module 36 may analyze the feedback signals and/or user preferences over time to determine types and/or usages of the loads 48 (process block 96). The assessment module 36 may also generate a user profile of associations and/or behaviors of a user associated with the consumer 16 (and/or a structure associated with the consumer 16) based on the types and/or usages of the loads (process block 98). Based on the user profile, one or more product/service offerings and/or suggestions may be provided to the user (process block 100). Additionally, in some embodiments, the assessment module 36 may determine one or more risk factors associated with the user and/or a structure of the consumer based on the user profile (process block 102) and send the one or more risk factors to one or more financial and/or insurance institutions (process block 104).

By strategically reducing loads in response to an overload condition of a power grid 10 power may be maintained to more consumers 16 with reduced or eliminated power interruptions. Furthermore, although the flowcharts are shown in a given order, in certain embodiments, process/decision blocks may be reordered, altered, deleted, and/or occur simultaneously. Additionally, the flowcharts are given as illustrative tools and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A power management system comprising:

processing circuitry; and non-transitory storage media storing instructions that, when executed by the processing circuitry cause the processing circuitry to perform operations comprising:

receiving an overload indicator indicative of an overload condition of a power grid configured to supply electrical power to a plurality of consumers;

receiving feedback signals indicative of respective power draws of a plurality of electrical components of a consumer of the plurality of consumers;

generating a load reduction plan based on the feedback signals of one or more electrical components of the plurality of electrical components, wherein the one or more electrical components are a subset of the plurality of electrical components; and wherein generating the load reduction plan comprises:

determining, via an artificial intelligence (AI) module of the power management system, a respective load purpose associated with at least one of the one or more electrical components from a plurality of load purposes, wherein the plurality of load purposes comprise a medical load purpose, an entertainment load purpose, a safety load purpose, a household load purpose, or a combination thereof; and determining, via the AI module of the power management system, a respective criticality of the at least one of the one or more electrical components based on the determined respective load purpose;

implementing the load reduction plan for the consumer of the plurality of consumers in response to the overload indicator, wherein the load reduction plan indicates a portion of the one or more electrical components of the consumer for which to reduce respective power draws on the electrical power;

sending one or more control signals to the portion of the one or more electrical components in accordance with the load reduction plan to change respective operating states of the portion of the one or more electrical components such that the respective power draws of the portion of the one or more electrical components are reduced; and restoring the respective operating states of at least a the portion of the one or more electrical components, in response to a revocation of the overload indicator or an all-clear indicator, by sending one or more restoring control signals to the portion of the one or more electrical components, wherein the all-clear indicator is representative of an end to the overload condition.

2. The power management system of claim 1, wherein the consumer comprises a structure having a power meter, and wherein the plurality of electrical components are disposed electrically after the power meter with respect to a flow of the electrical power from the power grid to the structure.

3. The power management system of claim 1, wherein the power management system is disposed at a location of the consumer.

4. The power management system of claim 3, wherein the overload indicator is received by the power management system from a utility operator of the power grid.

5. The power management system of claim 1, wherein the one or more electrical components comprise an electronically controllable circuit breaker of a breaker box of the consumer, a smart controller, a smart load, or any combination thereof.

6. The power management system of claim 1, wherein the operations comprise:

obtaining respective user priorities of the plurality of electrical components;

determining respective criticalities of the plurality of electrical components based on the feedback signals and the respective user priorities of the plurality of electrical components; and generating the load reduction plan based on the respective criticalities of the plurality of electrical components.

7. The power management system of claim 1, wherein generating the load reduction plan comprises analyzing the feedback signals via an artificial intelligence (AI) AI algorithm.

8. The power management system of claim 1, wherein the plurality of electrical components comprises a plurality of loads, and wherein the operations comprise:

determining respective types of the plurality of loads and respective usages of the plurality of loads based on the feedback signals, a set of user preferences corresponding to the plurality of loads, or both;

generating a user profile comprising associations between with the respective types of the plurality of loads; and providing a product offering, a service offering, or both to a user associated with the user profile based on the user profile.

9. A method comprising:

receiving, via a power management system, feedback signals indicative of respective power draws of a plurality of electrical loads of a consumer of an electrical grid configured to supply electrical power to the consumer;

receiving an overload indicator indicative of an overload condition of the electrical grid;

generating a load reduction plan based on additional feedback signals of one or more electrical components of the plurality of electrical loads, wherein the one or more electrical components are a subset of the plurality of electrical loads; and wherein generating the load reduction plan comprises:

determining, via an artificial intelligence (AI) module of the power management system, a respective load purpose associated with at least one of the one or more electrical components from a plurality of load purposes, wherein the plurality of load purposes comprise a medical load purpose, an entertainment load purpose, a safety load purpose, a household load purpose, or a combination thereof; and determining, via the AI module of the power management system, a respective criticality of the at least one of the one or more electrical components based on the determined respective load purpose;

implementing, via the power management system, the load reduction plan;

sending, via the power management system, one or more control signals to the one or more electrical components of the consumer such that respective power draws of the one or more electrical components are reduced;

restoring the respective power draws of at least a portion of the one or more electrical components, in response to a revocation of the overload indicator or an all-clear indicator, by sending one or more restoring control signals to the portion of the one or more electrical components, wherein the all-clear indicator is representative of an end to the overload condition;

generating, via an assessment module of the power management system, a user profile comprising associations with types of electrical devices associated with the plurality of electrical loads and usages of the electrical devices based on the feedback signals; and providing, via a graphical user interface, a product offering, a service offering, or both to a user associated with the user profile based on the user profile.

10. The method of claim 9, wherein the one or more electrical components control operating states of a second portion of the plurality of electrical loads, a third portion of the plurality of electrical loads, or both.

11. The method of claim 9, comprising:

obtaining a set of user preferences comprising the types of electrical devices associated with the plurality of electrical loads, user priorities of the plurality of electrical loads, or both.

12. The method of claim 11, wherein the set of user preferences is generated by an artificial intelligence the AI module of the power management system based on the feedback signals.

13. The method of claim 9 comprising:

determining one or more behaviors of the user profile based on the types of electrical devices and the usages of the electrical devices; and determining one or more risk factors associated with the user profile based on the one or more behaviors.

14. The method of claim 13, comprising:

sending the one or more risk factors to a financial institution, an insurance institution, or both;

providing, based on the one or more risk factors, the product offering, the service offering, or both; or both.

15. A system comprising:

a power grid configured to provide electrical power to a plurality of consumers; and a power management system of a utility operator configured to:

monitor conditions of the power grid;

receive feedback signals indicative of respective power draws of a plurality of electrical loads of a consumer of the plurality of consumers generate an overload indicator indicative of an overload condition of the power grid;

generate a load reduction plan based on additional feedback signals of one or more electrical components of the plurality of electrical loads, wherein the one or more electrical components are a subset of the plurality of electrical loads, and wherein generating the load reduction plan is configured to:

determine, via an artificial (AI) module of the power management system, a respective load purpose associated with at least one of the one or more electrical components from a plurality of load purposes, wherein the plurality of load purposes comprise a medical load purpose, an entertainment load purpose, a safety load purpose, a household load purpose, or a combination thereof; and determine, via the AI module of the power management system, a respective criticality of the at least one of the one or more electrical components based on the determined respective load purpose;

implement the load reduction plan for the consumer of the plurality of consumers in response to the overload indicator, wherein the load reduction plan indicates one or more electrical components of the consumer for which to reduce respective power draws on the electrical power; and send one or more control signals to the one or more electrical components in accordance with the load reduction plan to change respective operating states of the one or more electrical components such that the respective power draws of the one or more electrical components are reduced; and restore the respective operating states of at least a portion of the one or more electrical components, in response to a revocation of the overload indicator or an all-clear indicator, by sending one or more restoring control signals to the portion of the one or more electrical components, wherein the all-clear indicator is representative of an end to the overload condition.

16. The system of claim 15, wherein the power management system is configured to:

implement a second load reduction plan, different from the load reduction plan, for a second consumer of the plurality of consumers in response to the overload indicator, wherein the second load reduction plan indicates one or more other electrical components, different than the one or more electrical components, of the second consumer for which to reduce respective power draws on the electrical power; and send one or more other control signals to the one or more other electrical components in accordance with the second load reduction plan to change respective operating states of the one or more other electrical components such that the respective power draws of the one or more other electrical components are reduced.

17. The system of claim 16, wherein the power management system is configured to:

receive second feedback signals indicative of the respective power draws of a second plurality of electrical components of the second consumer, wherein the one or more other electrical components are a second subset of the second plurality of electrical components;

and generate the second load reduction plan based on the second feedback signals.

18. The system of claim 15, wherein the power management system of the utility operator is further configured to:

enable a test mode configured to simulate the load reduction plan for the consumer without implementing the load reduction plan; and generate a visualization, in response to the test mode being enabled, to be displayed via a graphical user interface of a personal device in communication with the power management system, wherein the visualization is configured to identify the one or more electrical components that would have the respective power draw associated with the one or more electrical components reduced based on the load reduction plan.

* * * * *